Figure 1:
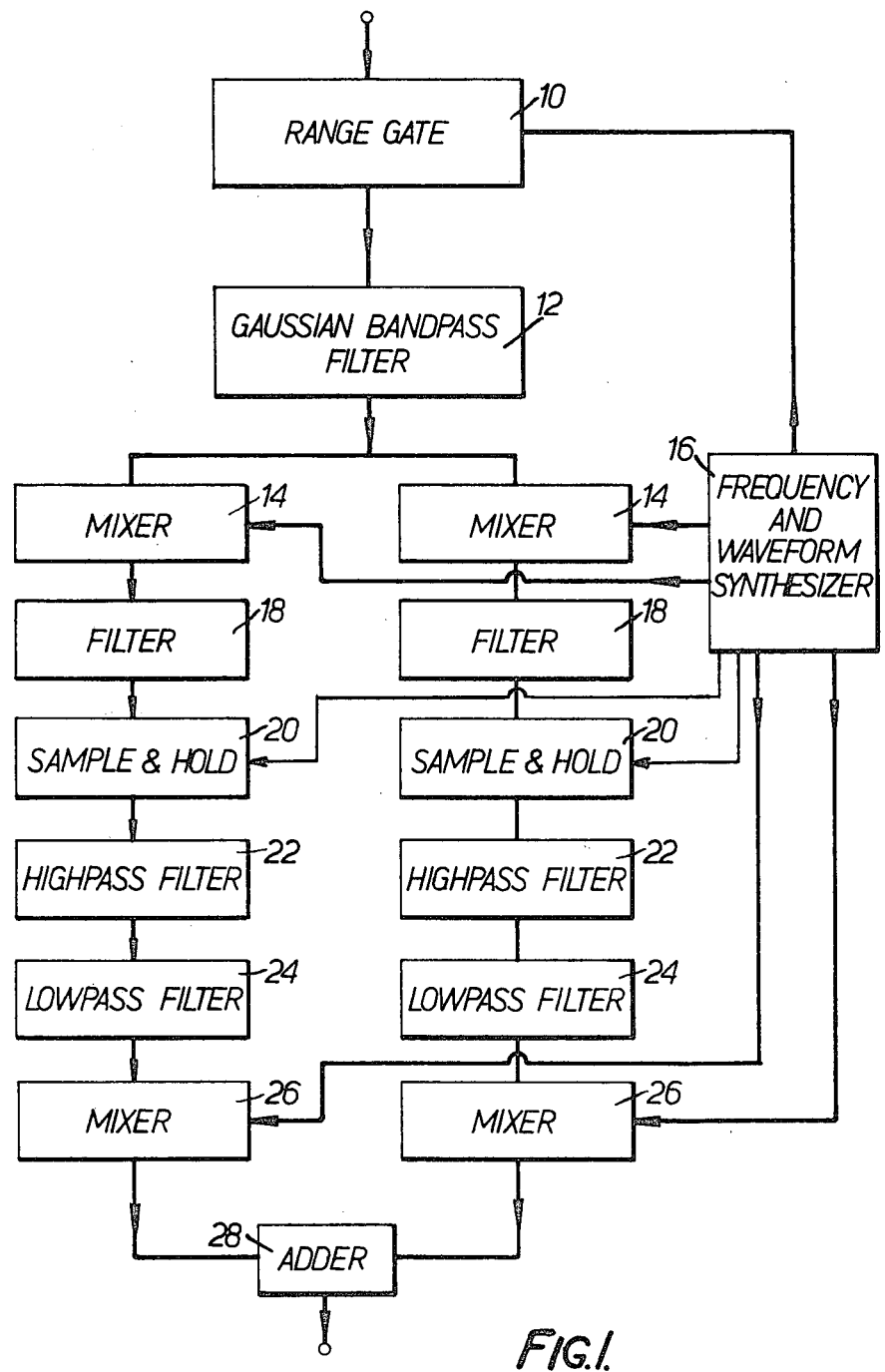

United States Patent [19]

Cross et al.

[11] 4,040,057

[45] Aug. 2, 1977

[54] CLUTTER FILTER FOR PULSE DOPPLER RADAR

[75] Inventors: Malcolm Geoffrey Cross, Colchester; John Howard Dawson, Chelmsford, both of England

[73] Assignee: The Marconi Company Limited, England

[21] Appl. No.: 628,544

[22] Filed: Nov. 3, 1975

[30] Foreign Application Priority Data

May 14, 1975 United Kingdom ............... 20242/75

[51] Int. Cl.² ............................................. G01S 7/28
[52] U.S. Cl. ........................... 343/17.1 PF; 343/5 SA; 343/9
[58] Field of Search ............ 343/5 SA, 7.7, 9, 17.1 R, 343/17.1 PF

[56] References Cited

U.S. PATENT DOCUMENTS

| | | |
|---|---|---|
| 3,766,553 | 10/1973 | Bergkvist ............................. 343/7.7 |
| 3,902,174 | 8/1975 | Siegel ........................ 343/17.1 PF X |
| 3,934,253 | 1/1976 | Wiedemann et al. ................. 343/7.7 |
| 3,950,749 | 4/1976 | Wiedemann .............. 343/17.1 PF X |
| 3,987,443 | 10/1976 | Cross ................................ 343/5 SA |

Primary Examiner—T.H. Tubbesing
Attorney, Agent, or Firm—Diller, Brown, Ramik & Wight

[57] ABSTRACT

The invention provides an improved clutter filter for a Pulse Doppler Radar utilizing rapidly changing p.r.f.'s. The filter is designed to reduce the effect of spectrum spreading which has previously caused difficulties.

5 Claims, 2 Drawing Figures

CLUTTER FILTER FOR PULSE DOPPLER RADAR

The present invention relates to Radar and in particular to Pulse Doppler Radar.

In Pulse Doppler Radar pulses or burst of microwave energy are transmitted with a certain pulse repetition frequency (p.r.f.). When a pulse falls on a target it is reflected and an echo pulse is received at a time after transmission corresponding to the range (i.e. distance) of the target from the transmitting antenna. To analyse the received information a set of gates are opened sequentially, each for a short period of time, after transmission of each pulse, each gate being arranged to pass the signals received from a predetermined range to a separate channel. Within each channel there is included means for analysing the spectrum of the received signal such as to determine the frequency of the received pulse. The shift in frequency between the transmitted pulse and the received pulse due to the Doppler effect is indicative of the velocity of any target falling within that predetermined range.

When the p.r.f. of a Pulse Doppler Radar is fixed, it is inherent that there should be a degree of ambiguity if the p.r.f. is such that transmitted pulses follow one another in a shorter interval than it takes for a response to be received from the furthermost target within the overall range of the radar. This ambiguity is caused by the fact that a received signal need not necessarily be caused by a reflection of the immediately preceding transmitted pulse but could be a reflection from a more distant target of an earlier transmitted pulse. Thus, any received signal may correspond to a set of possible ranges for the target, the separation of the individual ranges being determined by the p.r.f. and the total number of ambiguities being a factor influenced both by the p.r.f. and the overall range of the radar.

A fixed p.r.f. may not only result in range ambiguities but also in velocity ambiguities. To appreciate this it is necessary to consider the frequency content of the transmitted signal. Because the transmissions are in the form of burst of a fixed carrier frequency, the carrier frequency is not the only frequency present but there are also present all frequencies resulting from modulation of the carrier frequency by the pulse repetition frequency. The frequency spectrum of such a transmission is a line spectrum centered on the carrier frequency $f_c$ and having a plurality of further frequencies each differing from the centre frequency by a multiple (including one) of the p.r.f. The amplitudes of the frequency components decrease gradually with increasing separation from the centre frequency. Spectrum analysis of reflections from a stationary target will yield this same line spectrum whereas reflections from a moving target will displace the transmitted spectrum by an amount proportional to the target velocity. In the presence of noise one cannot be sure that in the received signal the component of greatest amplitude is the centre frequency and it is therefore possible to have a plurality of possible velocities each yielding effectively the same spectrum upon anaylsis.

In order to remove ambiguities in range and velocity it has already been proposed to change the pulse repetition frequency of the radar in between scans. That is to say, it has been suggested that one may carry out a complete scan of the area of surveillance with one p.r.f. and then to carry out a second scan with a second p.r.f. The second p.r.f. will also have its own range ambiguities but provided that the two p.r.f.'s are not harmonically related one may remove ambiguities by cross-correlation. This is because if each p.r.f. yields a set of possible ranges for a target, there should only be one target range which occurs in both sets. Similarly velocity ambiguities may be sorted out by cross-correlation.

This proposal, however, gives rise to its own difficulties. A first difficulty is concerned with the fact that unambiguous information relating to any target can only be obtained after two complete scans. This may mean a delay of one or two seconds and such a delay is often unacceptable, for example where the target being detected is a missile approaching at high speed. A second difficulty arises in signal processing since all the information derived during a scan, i.e. information relating to all targets within an area of surveillance, must be stored for a period of one scan so that it may be correlated with the information derived from the subsequent scan. Even if such storage does not in itself give rise to very severe problems, there is still difficulty in correlating the information derived during a scan with the information stored in respect of a preceding scan since any target of interest is likely already to have changed its position and possibly even its speed. In the case of a rapidly moving target, it may mean that during one scan the target gives rise to a reflection passed by a first range gate and in the next scan by a different range gate. Thus, any system attempting to correlate information from one scan to the next is inherently involved, complex and consequently expensive and more susceptible to failure.

To resolve ambiguities without the need for storage and correlation between scans, it is necessary to change the pulse repetition frequency of the radar sufficiently rapidly that during a single scan any target gives rise to reflections with two p.r.f.'s thus, the p.r.f. should be changed during the time that the beam takes to traverse any point in space. Previously, fast changes in p.r.f. have always been considered as undesirable as they are likely to give rise to an unacceptable level of spectrum spreading, particularly from clutter.

The present invention seeks to provide a clutter filter for use in a Pulse Doppler Radar with rapidly changing p.r.f. which is not unduly affected by the foregoing problem.

According to the present invention a clutter filter for a Pulse Doppler Radar utilizing rapidly changing p.r.f.'s comprises a bandpass filter operative to receive signals derived from echo pulses and serving to reduce the frequency spectrum of the signals, frequency changing means for reducing the frequency of the output signals of the bandpass filter such that the resultant signals have a frequency less than the lowest p.r.f. of the radar for all targets travelling at less than a predetermined velocity, a sample-and-hold circuit arranged to sample the output of the frequency changing means at times related to the prevailing p.r.f. of the Radar and filter means for smoothing abrupt signal transition in the output signals of the sample-and-hold circuit and for attenuating frequency components resulting from undesired stationary and slow moving objects.

If the frequency changing means is operative to mix with the output of the bandpass filter a frequency equal to the centre frequency of a response derived from a stationary target, the output of the sample-and-hold circuit will be centred on DC and will have AC components only when there is a Doppler shift in the echo pulse. If a single mixing channel is used under such circumstances then it cannot be determined whether the target responsible for the echo is travelling towards or away from the radar aerial.

In order to preserve the information indicative of the sense of motion of a target, the output of the bandpass filter is preferably connected to two frequency changing circuits operative to subtract from the output signals of the bandpass filter signals of the same frequency but out of phase with one another, each frequency changer being followed by a respective sample-and-hold circuit and filter means as earlier described, there being provided means for vectorially summing the output signals of the two filter means in the two channels.

Preferably the means for vectorially summing the output signals of the two filter means, include two mixers each connected to a respective one of the two filter means and operative also to receive one of two signals of the same frequency as one another but of the same relative phase as the signals applied to the frequency changers and means for summing the output signals of the latter two mixers.

The filter means connected to the output of each sample-and-hold circuit preferably comprises a first high pass filter arranged to reject components in the outputs of the sample-and-hold circuits resulting from clutter and a low pass filter for smoothing the abrupt transitions resulting from the discrete action of the sample-and-hold circuits.

Figure 2:
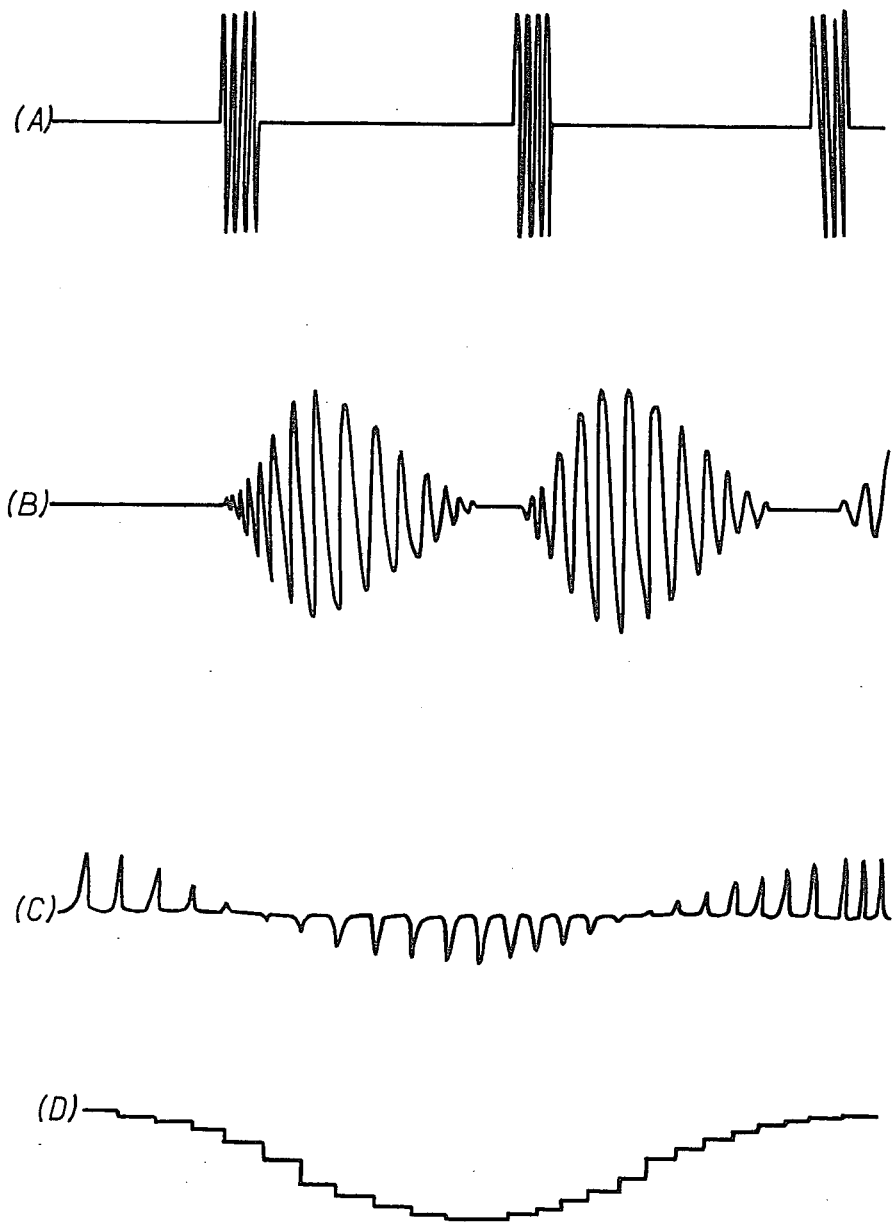

The invention will now be described further, by way of example, with reference to the accompanying drawings in which:

FIG. 1 is a block circuit diagram of a clutter filter arrangement in accordance with the invention, and FIG. 2 shows the wave forms appearing at selected points within the arrangement of FIG. 1.

Referring to FIG. 1, a range gate 10 is arranged to receive echo pulses after they have been reduced by a mixing circuit (not shown) to i.f. frequency centred on $F_o$. The range gate is opened at a predetermined time following each transmitted pulse and is therefore adapted to pass on signals from targets lying within a predetermined range from the antenna. The signal A passed by the range gate is shown in FIG. 2. The signal consists of bursts spaced apart by a time determined by the prevailing p.r.f. and of a width determined by the time during which the range gate is open. The frequency of the burst is equal to the i.f. frequency $F_o$ for any target that is stationary but will have a frequency $F_o + F_d$ for a moving target, $F_d$ being a Doppler frequency shift.

It will be appreciated that there are a plurality of range gates, each having its own filter for removing clutter, the arrangement of FIG. 1 being concerned with only one such clutter filter.

The range gated signals are applied to a Gaussian bandpass filter 12 which produces an output B as shown in FIG. 2. Each echo pulse gives rise to a Gaussian shaped pulse which has a longer duration than the range gated pulses but which nevertheless has the same frequency within the Gaussian shaped envelope. The filter 12 is so designed that each output pulse falls to a negligible amplitude before the commencement of a subsequent pulse.

The output signals of the Gaussian bandpass filter 12 are applied to two channels in parallel, the two channels being identical in all respects other than those indicated below. Each channel includes a mixer 14 which is operative to mix with the output of the Gaussian bandpass filter a frequency $F_o$ equal to the i.f. frequency and derived from a frequency and wave form synthesizer 16 which also controls the times during which the range gate 10 is opened. The signals applied to the mixers 14 in the two channels are of the same frequency but are 90° out of phase with one another.

The output of each mixer 14 is applied to a Gaussian low pass filter 18 which is designed to filter out mixing products other than those having a frequency centred on D.C. The output C of the low pass Gaussian filter 18 is shown in FIG. 2. The wave form C is drawn to a different time scale from the wave forms A and B so that while only two pulses are shown in B, several are illustrated in C to explain the long term trend. The mixing and filtering result in a low frequency signal having peaks occurring at known times following the opening of the range gate. For a stationary target the same D.C. level will be obtained from consecutive gating periods but when there is a Doppler shift, as is the case shown in waveform C the amplitudes of the pulses follow the Doppler signal envelope. This is because the phase of the two signals mixed in the mixer 14 will always be the same in the case of a stationary target and as the frequency changes on account of Doppler shift the phase will change from one gated pulse to the next so that there is continual amplitude variation in the mixer output at the rate determined by the Doppler frequency.

This output signal is sampled at its peaks by a sample-and-hold circuit 20 which is also controlled by the frequency and wave form synthesizer 16. As the delays within the Gaussian bandpass filter are known the time of occurrence of the peaks of the pulses is known so that the sample-and-hold circuit can be made to sample at known instants, preferably at the peak amplitudes. The output of the sample-and-hold circuit is shown in waveform D of FIG. 2 and consists of a series of abrupt steps but having a large fundamental component having a frequency equal to that of the Doppler shift $F_d$.

It will be noticed that in the wave form C of FIG. 2 there is at one point a transition from one p.r.f. to the other so that the spacing between the pulses is not even but adopts one of two values. Because of the Gaussian bandpass filters 12 and 18 there is little spectral spreading by p.r.f. switching of the residual transient energy and there is no marked effect at the transition from one p.r.f. to the next. In the wave form D of FIG. 2, the samples last for different periods, depending on the prevailing p.r.f. but there is no significant transient effect at the instant of switching.

The output D shown in FIG. 2 is fed to a high pass filter which only allows to pass signals resulting from other than clutter, that is to say, signals having an A.C. component within the Doppler frequency band of interest. This signal is then passed onto low pass filter 24 which smoothes out the square outline of the sample voltages by eliminating high frequencies and only allows through the Doppler frequency.

This Doppler frequency now serves to modulate an i.f. frequency derived from the frequency and wave form synthesizer 16 in one of two mixers 26, the two mixers 26 being arranged to receive i.f. frequencies in phase quadrature with one another. The output of the mixers is summed in a summation circuit 28 to reconstitute a frequency modulated i.f. signal whose frequency is determined by the Doppler shift of any moving target and whose phase information has not been lost because of the use of two channels in phase quadrature. Only responses from moving targets are available at the output of the summation circuit 28 since all clutter will be removed by the high pass filters 22.

We claim:

1. A clutter filter for a Pulse Doppler Radar in which the p.r.f. of the transmitted pulse is changed during the time taken to scan across a given target, the filter including a bandpass filter operative to receive signals derived from echo pulses and serving to reduce the frequency spectrum of the signals, frequency changing means for reducing the frequency of the output signals of the bandpass filter such that the resultant signals have a frequency less than the lowest p.r.f. of the radar for all targets travelling at less than a predetermined velocity, a sample-and-hold circuit arranged to sample the output of the frequency changing means at times related to the prevailing p.r.f. of the Radar and filter means for smoothing abrupt signals transition in the output signals of the sample-and-hold circuit and for attenuating frequency components resulting from undesired stationary and slow moving objects.

2. A clutter filter as claimed in claim 1 and wherein the output of said bandpass filter is connected to two frequency changing circuits operative to subtract from the output signals of the bandpass filter signals of the same frequency but out of phase with one another, each frequency changer being followed by a respective sample-and-hold circuit and filter means as earlier described, there being provided means for vectorially summing the output signals of the two filter means in the two channels.

3. A clutter filter as claimed in claim 2 and wherein the means for vectorially summing the output signals of the two filter means, include two mixers each connected to a respective one of the two filter means and operative also to receive one of two signals of the same frequency as one another but of the same relative phase as the signals applied to the frequency changes and means for summing the output signals of the latter two mixers.

4. A clutter filter as claimed in claim 2 and wherein the filter means connected to the output of each sample-and-hold circuit comprises a first high pass filter arranged to reject components in the outputs of the sample-and-hold circuits resulting from clutter and a low pass filter for smoothing the abrupt transitions resulting from the discrete action of the sample-and-hold circuits.

5. In a Pulse Doppler Radar in which the p.r.f. of transmitted pulses is changed during the time taken to scan across a given target and including a range gate and means for opening the range gate at a time subsequent to each transmitted pulse to pass signals derived from the echos from said given target, a clutter filter for said range gate which comprises:

bandpass filter means receiving said signals from said range gate for reducing the frequency spectrum of said signals;

mixing means receiving the output of said bandpass filter means for mixing a signal therewith which is of a frequency equal to that of signals received by said range gate when said given target is stationary;

filter means receiving the output of said mixing means for producing a series of output pulses whose amplitudes follow the envelope of the Doppler signal component of said signals passed by said range gate, said output pulses occurring at known times relative to the transmissions of transmitted pulses;

sample and hold means operated at said known times for producing a series of abrupt steps having a fundamental component of frequency equal to that of said Doppler signal; and filter means for smoothing abrupt signals transition in the output signals of the sample and hold means and for attenuating frequency components resulting from undesired stationary and slow moving objects.

* * * * *